(12) United States Patent
Odom

(10) Patent No.: US 7,047,482 B1
(45) Date of Patent: May 16, 2006

(54) AUTOMATIC DIRECTORY SUPPLEMENTATION

(76) Inventor: Gary Odom, 15505 SW. Bulrush La., Tigard, OR (US) 97223

( * ) Notice: Subject to any disclaimer, the term of this patent is extended or adjusted under 35 U.S.C. 154(b) by 623 days.

(21) Appl. No.: 09/796,235

(22) Filed: Feb. 28, 2001

(51) Int. Cl.
*G06F 7/76* (2006.01)
*G06F 17/21* (2006.01)

(52) U.S. Cl. ............................. 715/500; 707/5; 707/3
(58) Field of Classification Search ............ 715/501.1, 715/500; 707/3, 5; 709/202
See application file for complete search history.

(56) References Cited

U.S. PATENT DOCUMENTS

| | | | |
|---|---|---|---|
| 5,535,382 A | 7/1996 | Ogawa | |
| 5,598,557 A | 1/1997 | Doner | |
| 5,680,511 A | 10/1997 | Baker | |
| 5,893,092 A * | 4/1999 | Driscoll | 707/5 |
| 6,100,890 A * | 8/2000 | Bates et al. | 715/826 |
| 6,122,647 A | 9/2000 | Horowitz | 707/513 |
| 6,138,157 A | 10/2000 | Welter | 709/224 |
| 6,182,133 B1 | 1/2001 | Horvitz | 709/223 |
| 6,184,886 B1 | 2/2001 | Bates | 345/357 |
| 6,480,853 B1 * | 11/2002 | Jain | 707/5 |
| 6,493,702 B1 * | 12/2002 | Adar et al. | 707/3 |
| 6,584,468 B1 | 6/2003 | Gabriel | |
| 2001/0039563 A1 * | 11/2001 | Tian | 709/202 |
| 2003/0195877 A1 * | 10/2003 | Ford et al. | 707/3 |

OTHER PUBLICATIONS

Maglio, Paul et al., Communications of the ACM, vol. 43, No. 8; "Intermediaries Personalize Information Streams" (Aug. 2000).*
Lieberman, Henry et al., Communications of the ACM, vol. 44, No. 8; "Exploring the Web with Reconnaissance Agents" (Aug. 2001).*
Balabanovic, Marko et al., Communications of the ACM, vol. 30, No. 3; "Content-Based, Collaborative Recommendation" Mar. 1997).*
Geisler, Gary et al., JCDL '01 in Roanoke, Virginia; "Developing Recommendation Services for a Digital Library with Uncertain and Changing Data" (Jun. 24-28, 2001).*
Grasso, Antonietta et al., GROUP 99 in Phoenix, Arizona; "Augmenting Recommender Systems by Embedding Interfaces into Practices" (1999).*
Voss, Angi et al., GROUP 99 in Phoenix, Arizona; "Concept Indexing" (1999).*

* cited by examiner

*Primary Examiner*—Doug Hutton

(57) ABSTRACT

The present invention is computer software that automatically finds, saves, and displays links to documents topically related to document links residing in a directory without a user having to search.

20 Claims, 5 Drawing Sheets

AUTOMATIC DIRECTORY SUPPLEMENTATION

TECHNICAL FIELD

The present invention relates generally to information retrieval systems, and more particularly, to automatically finding and displaying related document links without user-initiated searching.

BACKGROUND OF THE INVENTION

The Internet has become the world's information retrieval system. One of the distinguishing features of Internet (and intranet) documents is the use of embedded document links. Such a link is a portion of a source document that links to a target document: another document, or a different section of the same document. The other document may be on any computer system on a network supporting the appropriate communication protocols. Selecting a link navigates from the source document to the target document.

A web site is a collection of linked documents accessible through the World Wide Web, a part of the Internet. Such documents are commonly called web pages. Typically a web site has a "home page" that is the entry document into the site. The World Wide Web is commonly referred to as "the web".

Web pages commonly use a description language such as HTML (hypertext markup language) or XML (extensible markup language) to embed links and provide document formatting.

A link on a web page is by convention expressed as a uniform resource locator (URL). A link is often associated with a word or phrase in a source document, hence the common nomenclature: hypertext link. But a link may also be associated with images, or controls such as buttons, menus, and the like.

A web browser is a program for displaying web pages. Examples of popular web browsers include Microsoft Internet Explorer and Netscape Navigator.

Web browsers allow users to create and maintain directories of web page links. Such directories are commonly represented as folders or, sometimes, tabs.

New web pages or web sites are commonly found by links in known documents, or by keyword search. Users typically topically group links to related documents in self-titled directories, the directory title being the common topic of links within it.

Web sites are often extensive enough (so many pages) that a site typically offers a search facility for the site; commercial web sites almost always offer site search. Search refers to inquiry based upon one or more keywords (search terms). Search engines that search a multitude of sites abound on the web. A good search engine provides a commercial advantage. Some search engines, and some commercial products, such as Copernic® from Copernic Technologies, tap into multiple search engines to conglomerate searches.

Based upon keywords, quality search engines glean the most probably related pages using a confluence of linguistic analysis methods. Word location analysis is based upon the assumption that the topic of a document is specified in the title, headings, or the early paragraphs of text. Word frequency analysis counts the number of times search terms appear in a document. Syntactic analysis processes the grammatical structure of a document, serving to indicate nouns and verbs. Semantic analysis interprets the contextual meaning of words by examining word relationships. Morphological analysis reduces verbs and nouns to their base form, providing a basis for direct word matching. At least one commercial product, LinguistX® from Inxight Software, provides advanced natural language text analysis.

In spite of software sophistication, as every experienced web user knows, user-initiated keyword search can be vexing: searches commonly return a plethora of pages, many unrelated to the desired topic. Search for 'watch', for example, thinking time pieces, and you'll likely end up with a bushel of pages about voyeurism. Careful application of search terms yields more relevant links, but the process and results are problematic: beyond searching for "this 'and' that", search Boolean logic is not exactly intuitive; different search engines have different syntaxes for search Boolean logic, and different ways to apply it, making that bit of business even less amenable; a bit of search pruning still leaves an abundance of junk, while a search result leaving out the chaff probably leaves out a good bit of wheat too.

The technology of document linking, search, and software-based linguistic analysis are well established. Recent advances enhance utility in locating desired information. For example, the subject of U.S. Pat. No. 6,122,647 is dynamically linguistically analyzing the text of a user-selected portion of a target document and generating new links to related documents. The subject of U.S. Pat. No. 6,184,886 is allowing a user to generate and maintain a list of prioritized bookmarks (links) that allow later access to selected sites (documents). The subject of U.S. Pat. No. 6,182,133 is pre-fetching pages for later viewing, thus saving a user time retrieving documents.

SUMMARY OF THE INVENTION

The present invention automatically finds, saves, and displays links to documents topically related to a set of documents without a user having to search or specify search terms. An incidental aspect of the invention is automatically signifying links by their status.

DETAILED DESCRIPTION OF THE INVENTION

Figure 1:
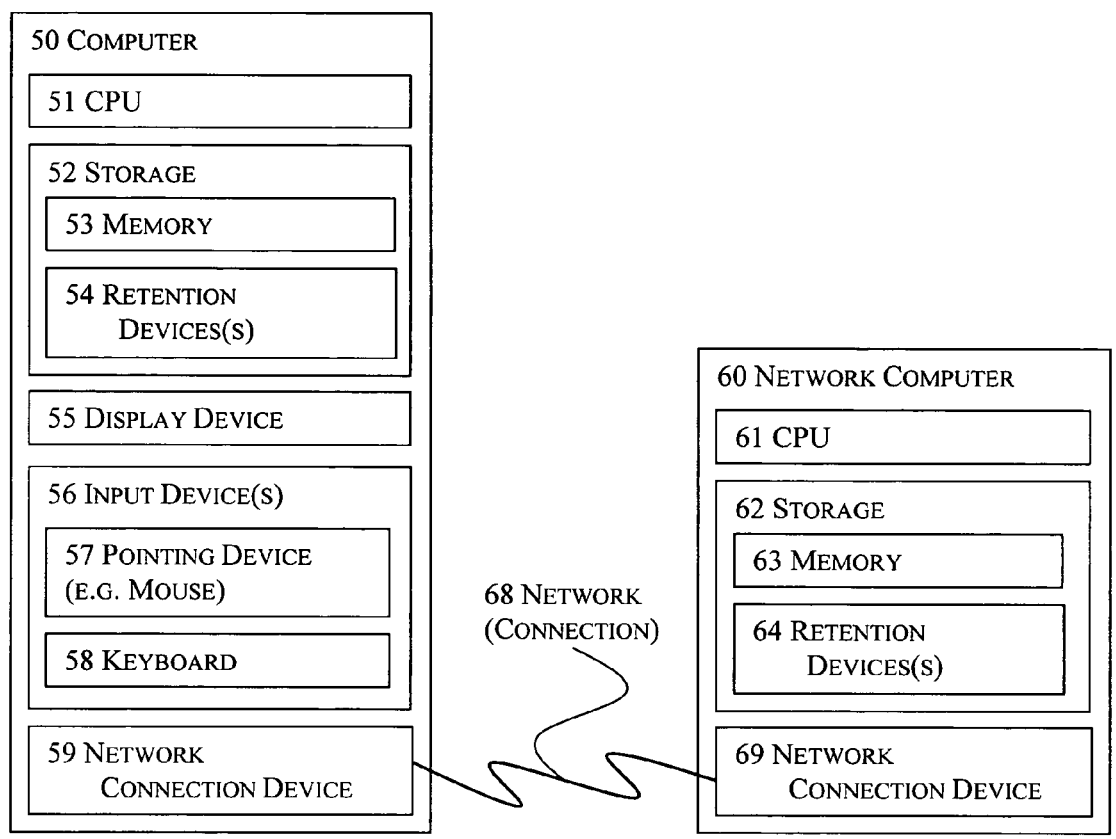
FIG. 1 is a block diagram of computers suitable for practicing the invention.

FIG. 1 is a block diagram of a computer 50 connected to a network computer 60 through a network 68. A computer 50 comprises at least a CPU 51; storage 52, which comprises memory 53 and optionally one or more devices with retention medium(s) 54 such as hard disks, diskettes, compact disks, or tape; an optional display device 55; and optionally one or more input devices 56, examples of which include but are not exclusive to, a keyboard 58, and/or one or more pointing devices 57, such as a mouse. A computer 50 also optionally includes a device for connection to a network 59. A network computer 60 comprises at least a CPU 51; storage 52, which comprises memory 53 and optionally one or more devices with retention medium(s) 64 such as hard disks, diskettes, compact disks, or tape; and a device for connection to a network 59. In one embodiment, a computer 50 is a client to a network computer 60 that is a server. A client-server environment is a setup whereupon one or more clients 50 are connected to one or more servers 60 through a network 68. A client 50 in a client-server environment primarily receives data. A server 60 primarily transmits data to be received by one or more clients 50. A peer-to-peer network is a setup whereupon one or more computers 50 are connected to one another 60 with or without a server on the network 68. A computer 50 in a peer-to-peer environment shares data with other computers 60. A network 68 may be any means by which one or more computers 50 are connected to one or more other computers 60 for data transfer.

Figure 2:
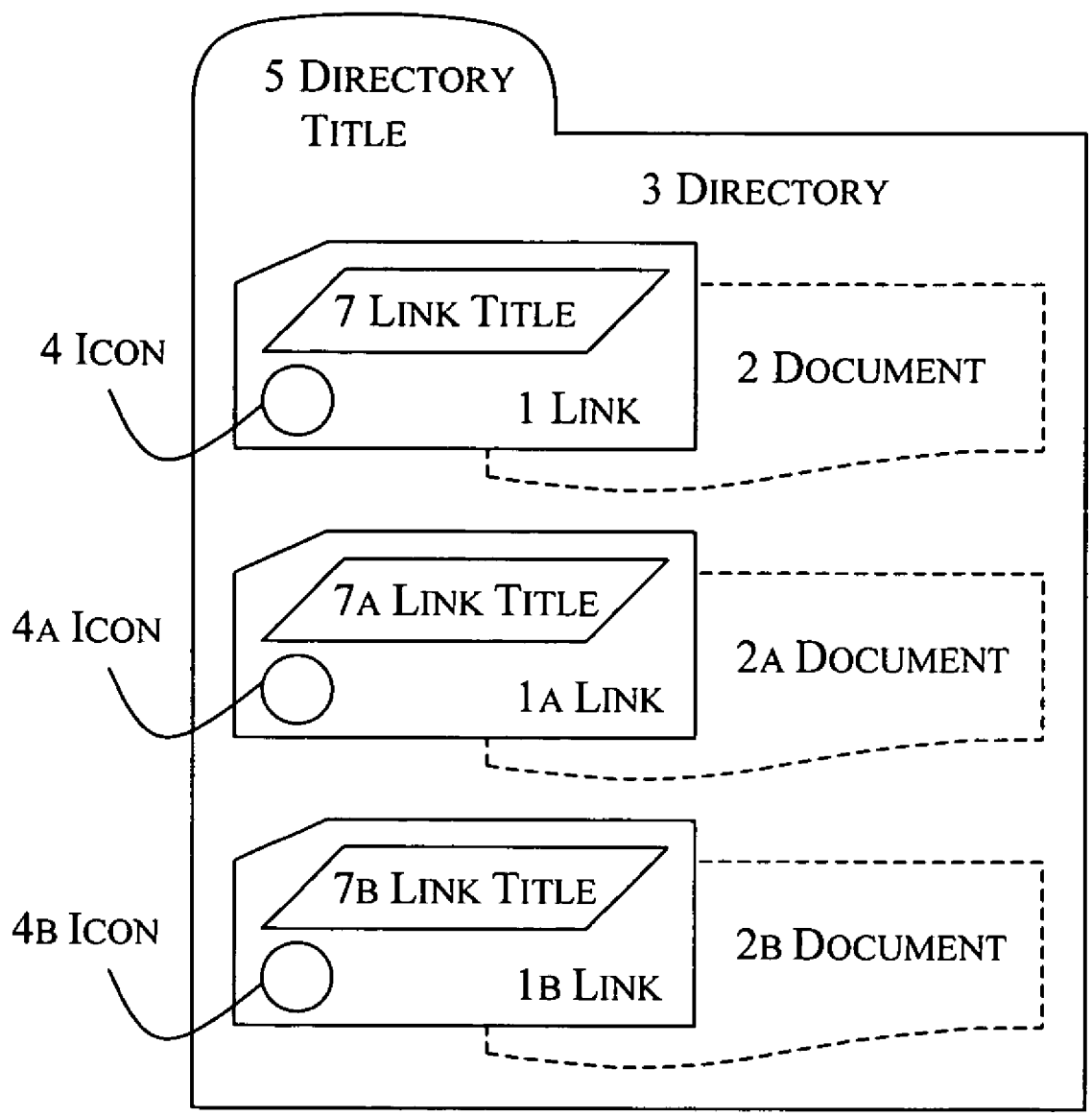
FIG. 2 depicts a directory of links.

As depicted in FIG. 2, a directory 3, if not empty, comprises a set of documents 2, or a set of links 1 to documents 2, or a combination of documents 2 and links 1. A link 1 is a reference to a document 2. A user-determined directory title 5 may provide concise topic indication.

Figure 3:
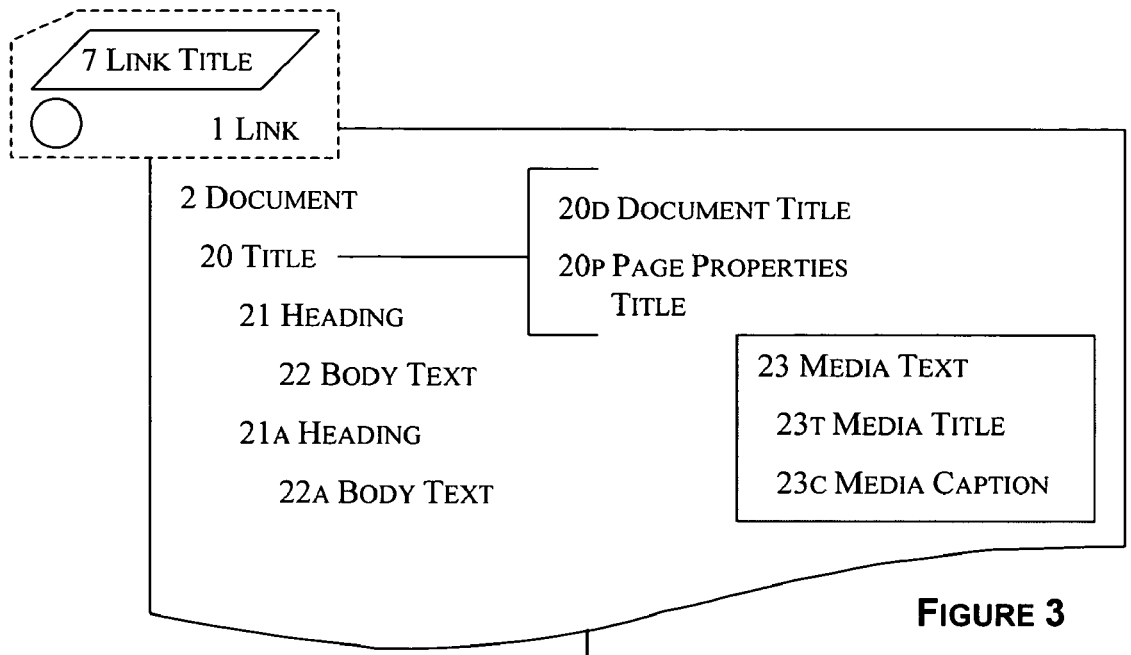
FIG. 3 depicts a document.

FIG. 3 depicts a document 2 to which a link 1 may refer, and document 2 components. A document 2 comprises at least a passage of text 22, and may optionally include one or more titles 20, section headings 21, or adjunctive text such as media titles 23T or captions 23C. A document 2 may comprise other components besides text, such as media objects. A media object is a non-text software entity, examples of which include a picture, video, or sound. Text related to a media object is media text 23.

Figure 4:
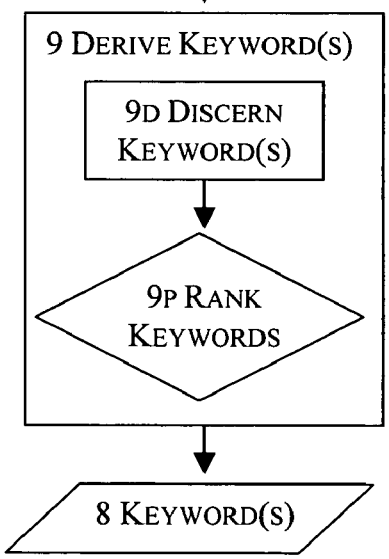
FIG. 4 depicts the process to derive keywords from a document.

FIG. 4 depicts keyword derivation 9. A keyword 8 is one or more words used as an indication of the contents of a document. A keyword 8 may be a combination of words: for example, the Grateful Dead are significantly different than being either grateful or dead.

Various linguistic analysis methods may be applied to documents 2 for keyword 8 derivation: lexical, word frequency, word placement, syntactic, semantic, or morphological. Such methods are known to those skilled in the art.

Automatically displaying a link 1 refers to displaying a link 1 of a found document 2 without a user having to manually add a link 1 to a directory 3.

Signifying a link 66 refers to visibly indicating the current status of a link 1. Examples of visible indication include color coding or other visible distinction of link 1 text, such a font style; or striking icon 4: either the usual icon 4 color coded, or icons 4 indicating status. Examples of status include a newly found link 1, a level of relevance for a newly discovered link 1, or an obsolete link 13.

Attempting to retrieve a document 2 from a link 1 sometimes reveals that the link 1 is no longer valid: the document 2 is gone, having been moved or removed. In this instance, the link 1 should be signified 66 as obsolete 13 if its document 2 has certainly been removed, or, if a link 1 to a moved document 2 can be ascertained, the stored link 1 should be updated to reflect the new document's 2 location. Pages 2 or sites that have moved often temporarily leave a notice behind telling where the site or page 2 has moved to. In such an instance, software linguistic analysis of the notification can glean the new link 1.

Document 2 inaccessibility does not necessarily mean link obsolescence 13: other possible causes exist, such as, for example, temporary server problems at the document's 2 home site. A link 1 should be signified 66 obsolete 13 only if document 2 removal can be verified: inaccessibility over a prolonged period of time would be indicative. For example, by keeping track of attempted access times, link obsolescence 13 may be concluded given document 2 inaccessibility at different times of the day for over a period of a week or so. Sometimes, document 2 removal is noted on a web page 2. In such an instance, software linguistic analysis of the notification can determine document 2 removal.

Titles 20, including document title 20D, and associated page properties title for web pages 20P, media object titles 23T, and headings (section titles) 21 are prime fodder for keywords. For a document 2 with a link 1, the link title 7 should also be considered for keyword derivation 9. Titles may be considered highly indicative of document topics/keywords 8. Likewise document headings 21, which can be identified by location, possibly font formatting, and isolation from body text 22; headings 21 in HTML documents are most always distinguished by font formatting, hence, easily identified.

Body text 22 may provide the bulk of information upon which keywords 8 are derived 9. A common technique is to highly regard the first paragraph of body text 22 (and the body text 22 immediately following headings 21) for keyword derivation 9, as the topic of a document 2 or section is typically revealed in the first paragraph (academically known as the "topic paragraph").

Once a document 2 has been analyzed and keywords discerned 9D, document 2 keywords 8 can be rated or ranked 9P. Factors esteeming a keyword 8 include the following: prominence and frequency primarily in titles 20 and secondarily in headings 21; prominence and frequency in topic paragraphs and media text 23. Otherwise, word frequency may be a primary keyword 8 indicator. A suggested method to rank keywords 9P is to use a point system to weigh relative prominence and frequency, where, for example, prominence may comprise two-thirds of a keyword's 8 score and frequency one-third. Keyword 8 relevancy rating schemes 9P are known to those skilled in the art.

Figure 5:
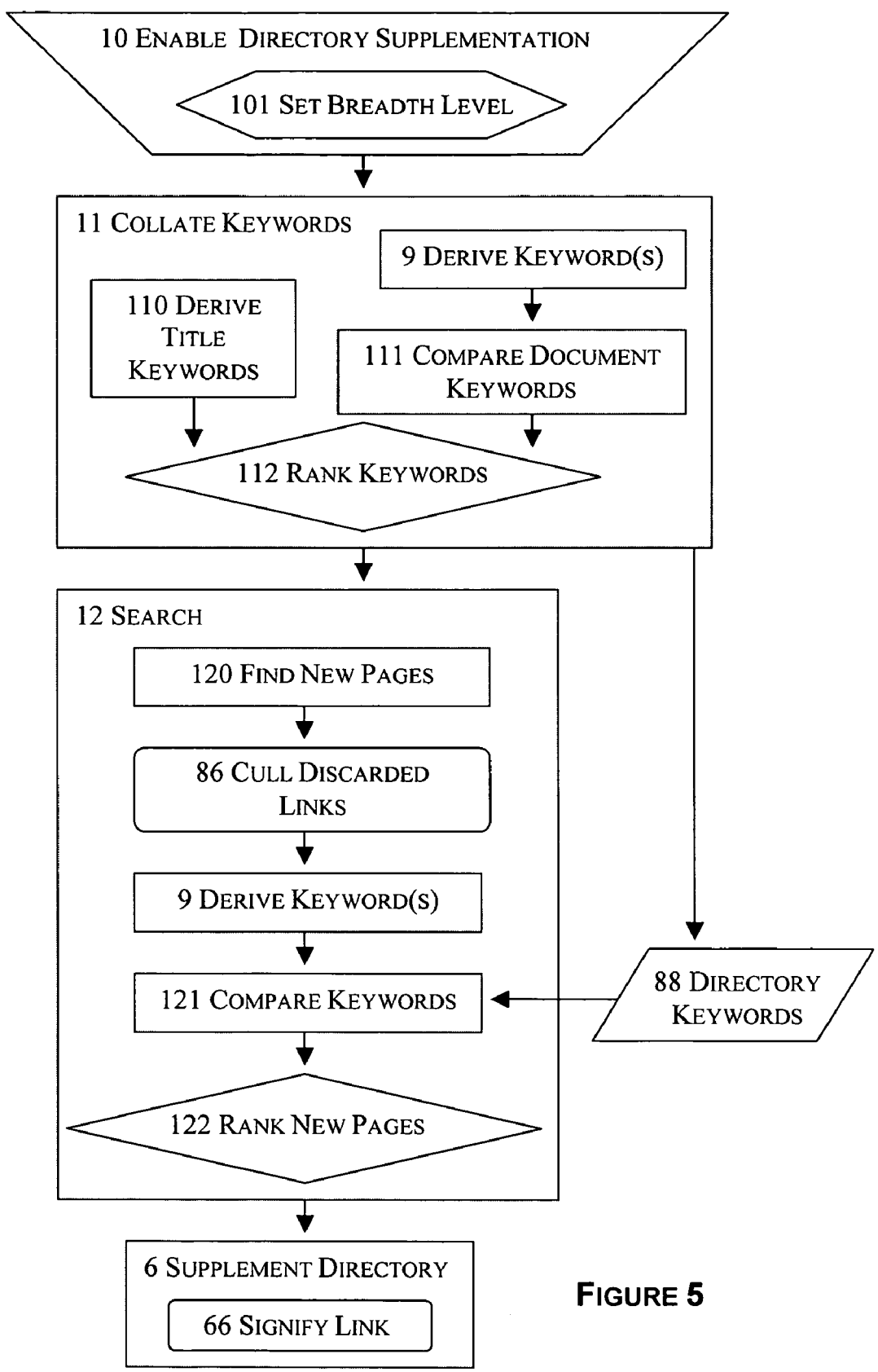
FIG. 5 depicts the directory supplementation process.

FIG. 5 depicts the directory supplementation 6 process. Directory supplementation 6 must be enabled 10. Directory supplementation 6 may be enabled 10 by default, by software-determined protocol, or by user determination. Automatically supplementing a directory 6 refers to adding links 1 or documents 2 to a directory 3 without a user having to search 12 or manually add links 1 to that directory 3.

Optionally, a breadth threshold level may be set 101. A breadth threshold level is intended as user-determined setting that possibly adjusts the number and potential relevance of accepted documents 2. Greater breadth casts a wider net: more links 1 or documents 2 are retained, and vice versa. If a user desires closely related documents 2 as a product of directory supplementation 6, set a low breadth level 101.

A relation threshold level would the mirror image equivalent to a breadth threshold level 101: a higher setting would be indication to limit directory supplementation 6 to closely related documents 2, and vice versa. Level indication 101 may be ordinal or numeric, such as percentage.

In an embodiment where breadth level setting 101 is employed, the setting 101 may be applied before and/or after search 12. A search 12 may use a broader setting 101 than the user specified. If then directory supplementation 6 presents sparse results, a user may want to adjust to a broader setting 101: if broader documents 2 have already been retrieved, the outcome of a broadened search may appear to the user immediately (with presentation of additional links 1).

Documents 2 in a directory 3 are analyzed 9 for keywords 8. Derived keywords 8 and attendant data may be stored to avoid repetition of the process 9. Attendant keyword data 8 may include keyword 8 rating data, such as keyword frequency and prominence in a document 2.

Though titles are necessarily terse, that very terseness makes directory 5 and link titles 7 an esteemed source of keywords 8. If directories 3 are hierarchical, topical information regarding a nested (lower level) directory 3 may be gleaned 110 by looking up the directory title 5 hierarchy. Title-derived 110 keywords 8 may be given the highest regard.

The final step in keyword collation 11 is ranking 112 the gleaned sets of keywords 8 from directory 3 documents 2 by cumulating and collating keywords 11. This is, in essence, a way of comparing documents via their derived keywords 8. If a document's 2 keywords 8 vary markedly from other documents 2 in its directory 3, that document's 2 keywords 8 may be disregarded. The outcome is a set of directory keywords 88 which may retained, along with attendant data or intermediate results, to avoid unnecessary repetition of the directory keyword collation process 11.

A Boolean logic search 12 for relevant documents 2 throughout all or part of a computer's or network storage (52, 62) proceeds based upon directory keywords 88. Candidate documents 2 may be found using cursory search 120 techniques, as winnowing may occur after documents 2 are found.

Once candidate documents 2 are found 120, links 1 to pages 2 or sites previously eliminated from the target directory 3 may be culled 86. The obvious implication is that to perform this function, previously deleted links 1 from a directory 3 must be remembered (though no longer displayed). Culling discarded links 86, though optional, is highly recommended, as not doing so degrades utility: making a user discard the same links 3 repeatedly would annoy the user.

Candidate document 2 keywords 8 are derived 9, then compared 121 to directory keywords 88. Unlike keyword collation 11, where keywords 8 may be incorporated (albeit on a prioritized basis), candidate document keyword comparison 121 to directory keywords 88 is a critical fitness evaluation which provides the basis for ranking candidate documents 122 for directory supplementation 6. A variety of methods for rating found documents 122 for relevance 33 to target keywords 88 are known to those skilled in the art.

Links 1 to pages 2 on the same site may be collated into a single link 1. This may be done after analyzing the pages 2 to determine the page 2 most closely related 33 to the desired information. As a result, the selected link 1 for supplementation 6 may be the site's home page 2, the top-most page 2 for that topical aspect of the site, or the particular page 2 with the most relevant information. A standout page 2 should not be hidden: in the instance of a fairly relevant site with a spot-on page 2, the smart choice is to use both.

Finally, in the preferred embodiment, the target directory 3 is supplemented 6 with links 1, concomitant to breadth level setting 101 if employed. Optionally, visibly signify links 66 to indicate relevance 33. In an alternate embodiment, the target directory 3 is supplemented 6 with newly found documents 2 in a manner similar to the preferred embodiment.

Figure 6:
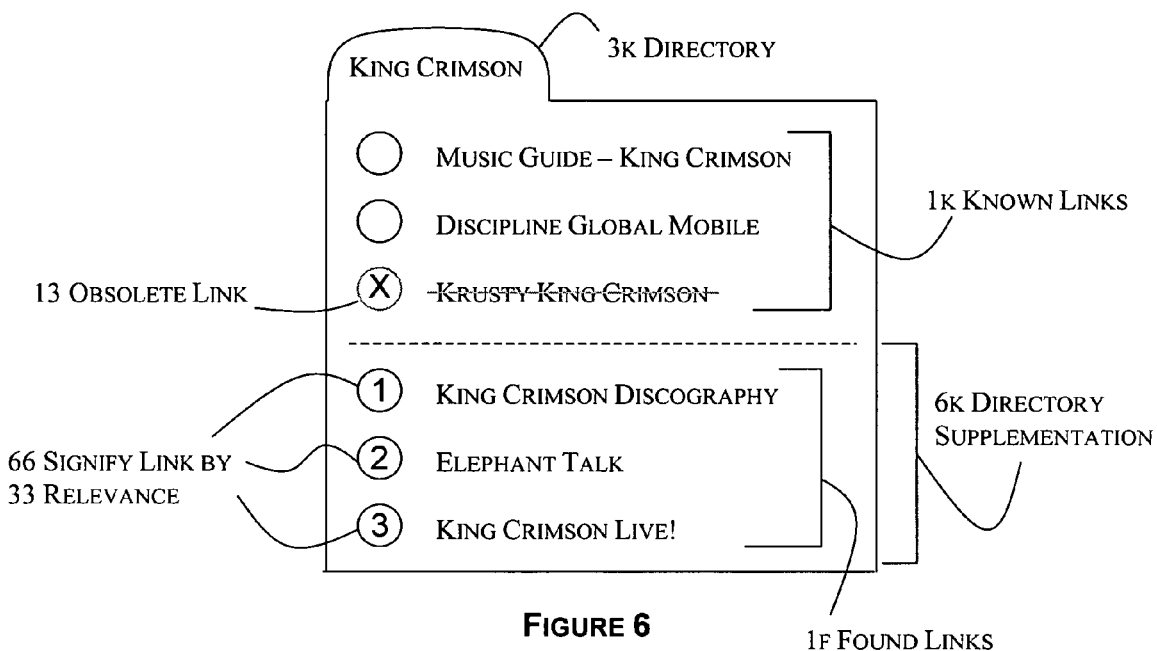
FIG. 6 depicts an example of directory supplementation.

FIG. 6 depicts an example directory 3K of links relating to the musical group King Crimson. The top section of the directory 3K shows existing links 1K. During the process of checking known linked documents 2 to derive 9 keywords 8, the "Krusty King Crimson" link is found obsolete 13, and visibly signified as such. The bottom section of the directory 3K illustrates directory supplementation 6K. In the depicted example, three newly discovered links 1F are displayed, along with indication 66 of their respective relevance 33. If a user had specified via breadth level setting 101 only displaying links 1 level 2 or better, the "King Crimson Live!" link 1F would not be displayed.

The invention claimed is:

1. A computer-implemented method for augmenting a directory without contemporaneous user input comprising:
   accessing at least a first document via a first directory without contemporaneous user selection of said first document, said first document comprising at least in part topical textual content;
   deriving at least one keyword indicative of at least one topical content from said first document;
   searching as a background operation a plurality of documents in storage in at least one computer without contemporaneous user input of a search location, such that said search comprises searching for documents related by said at least one keyword to said first document, thereby accessing a second document;
   determining relevance of said second document to said at least one keyword; and
   adding a reference to said second document in a results directory.

2. The method according to claim 1, wherein at least part of said storage is on a different computer than the computer storing said first directory.

3. The method according to claim 1, further comprising deriving a plurality of keywords.

4. The method according to claim 3, further comprising ranking at least two of said plurality of keywords.

5. The method according to claim 1, further comprising accessing a plurality of documents in said first directory.

6. The method according to claim 1, with the additional step of signifying the relevance of said second document to documents in the first directory when displaying said results directory.

7. The method according to claim 1, with the additional step of comparing the relevance of said second document to a preset threshold.

8. The method according to claim 1, wherein said results directory is said first directory.

9. The method according to claim 1, with the additional step of displaying said results directory.

10. The method according to claim 1, further comprising recognizing a precondition for autonomously augmenting said results directory, prior to accessing said first document.

11. A computer-implemented method for augmenting a directory comprising:
   autonomously initiating operation based upon a stored precondition;
   accessing at least a first document without contemporaneous user selection, wherein said first document comprises at least in part topical textual content;
   deriving at least one keyword indicative of at least one topical content within said first document;
   as a background operation, searching in storage in at least one computer for documents related by said at least one keyword to said first document, wherein at least some of said searched documents are independent and not organized in relation to one another;
   determining relevance of a search-accessed second document to said at least one keyword; and
   adding a reference to said second document in a results directory.

12. The method according to claim 11, wherein said storage is on a plurality of computers connected to at least one network.

13. The method according to claim 11, further comprising:
deriving a plurality of keywords; and
determining relevance of said second document to said plurality of keywords.

14. The method according to claim 11, further comprising comparing the relevance of said second document to a preset threshold.

15. The method according to claim 11, further comprising conditionally adding said reference to said second document depending upon whether said reference to said second document already exists in said results directory.

16. A computer-implemented method for augmenting a directory comprising:
accessing a plurality of grouped documents without contemporaneous user selection initiating said access;
deriving a plurality of keywords indicative of an aggregate content of said grouped documents;
prioritizing a relative relevance of said keywords;
storing said plurality of keywords with regard to said relevance;
searching as a background operation storage in at least one computer for documents related to said plurality of stored keywords;
determining relevance of a found second document to said plurality of stored keywords;
conditionally adding a reference to said second document in a results directory.

17. The method according to claim 16, with the additional step of comparing the relevance of said second document to a preset threshold.

18. The method according to claim 16, wherein said storage is on a plurality of computers connected to at least one network.

19. The method according to claim 16, wherein adding a duplicate reference in said results directory is avoided.

20. The method according to claim 16, wherein adding a reference that was previously deleted from said results directory is avoided.

* * * * *